(12) United States Patent
Venderbosch et al.

(10) Patent No.: US 12,031,025 B2
(45) Date of Patent: Jul. 9, 2024

(54) COMPOSITION COMPRISING POLYESTER AND POLYOLEFIN

(71) Applicant: SABIC GLOBAL TECHNOLOGIES B.V., Bergen Op Zoom (NL)

(72) Inventors: Robert Walter Venderbosch, Geleen (NL); Sjoerd Van Nispen, Geleen (NL); Johannes Peter Antonius Martens, Geleen (NL); Rob Boonman, Geleen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 779 days.

(21) Appl. No.: 17/056,476

(22) PCT Filed: May 17, 2019

(86) PCT No.: PCT/EP2019/062755
§ 371 (c)(1),
(2) Date: Nov. 18, 2020

(87) PCT Pub. No.: WO2019/219888
PCT Pub. Date: Nov. 21, 2019

(65) Prior Publication Data
US 2021/0198478 A1 Jul. 1, 2021

(30) Foreign Application Priority Data
May 18, 2018 (EP) .................... 18173113

(51) Int. Cl.
| | | |
|---|---|---|
| *C08L 67/00* | (2006.01) | |
| *B29C 45/00* | (2006.01) | |
| *C08G 63/183* | (2006.01) | |
| *C08G 63/199* | (2006.01) | |
| *C08G 63/672* | (2006.01) | |
| *C08J 3/00* | (2006.01) | |
| *C08L 23/06* | (2006.01) | |
| *C08L 23/08* | (2006.01) | |
| *C08L 23/12* | (2006.01) | |
| *C08L 67/02* | (2006.01) | |
| *B29L 31/52* | (2006.01) | |

(52) U.S. Cl.
CPC ........ *C08L 67/025* (2013.01); *B29C 45/0001* (2013.01); *C08G 63/183* (2013.01); *C08G 63/199* (2013.01); *C08G 63/672* (2013.01); *C08J 3/005* (2013.01); *C08L 23/06* (2013.01); *C08L 23/0815* (2013.01); *C08L 23/0884* (2013.01); *C08L 23/12* (2013.01); *B29L 2031/529* (2013.01); *C08L 2203/30* (2013.01); *C08L 2205/02* (2013.01); *C08L 2205/035* (2013.01); *C08L 2205/08* (2013.01); *C08L 2207/04* (2013.01); *C08L 2207/062* (2013.01); *C08L 2207/066* (2013.01)

(58) Field of Classification Search
CPC .......... C08L 67/02; C08L 23/00; C08L 23/04; C08L 23/06; C08L 23/12; C08L 23/14; C08L 23/08
See application file for complete search history.

(56) References Cited

U.S. PATENT DOCUMENTS

| | | |
|---|---|---|
| 5,017,714 A | 5/1991 | Welborn, Jr. |
| 5,281,668 A | 1/1994 | Heggs et al. |
| 5,324,820 A | 6/1994 | Baxter |
| 6,447,859 B2 | 9/2002 | Oguro et al. |
| 2006/0287441 A1 | 12/2006 | Miyama et al. |
| 2007/0004813 A1 | 1/2007 | Shelby et al. |

FOREIGN PATENT DOCUMENTS

| | | | |
|---|---|---|---|
| DE | 10027209 | * | 12/2001 |
| FR | 2961213 | * | 12/2011 |
| FR | 2961213 A | | 12/2011 |
| JP | 0570636 A | | 3/1993 |
| JP | 2001-316571 | * | 11/2001 |
| WO | 2017097630 A1 | | 6/2017 |
| WO | WO 2017/097630 | * | 6/2017 |

OTHER PUBLICATIONS

Translation of FR 2961213 (Year: 2011).*
Translation of DE 10027209 (Year: 2001).*
Translation of JP 2001-316571 (Year: 2001).*
International Search Report for International Application No. PCT/EP2019/062755, International Filing Date May 17, 2019, dated Aug. 9, 2019, 6 pages.
Peacock, Andrew J., "Handbook of Polyethylene, Chapter 3 Production Processes", 2000, Marcel Dekker, Inc., New York; ISBN 0824795466; p. 43-66.
Written Opinion for International Application No. PCT/EP2019/062755, International Filing Date May 17, 2019, dated Aug. 9, 2019, 5 pages.

* cited by examiner

*Primary Examiner* — Robert C Boyle
(74) *Attorney, Agent, or Firm* — CANTOR COLBURN LLP

(57) ABSTRACT

The invention relates to a composition comprising A) a polyester, B) a polyolefin and C) a compatibilizer, wherein A) comprises a first polyester derived from an aromatic dicarboxylic acid, an acyclic aliphatic diol and at least one of a cycloaliphatic diol and spiroglycol and a second polyester different from the first polyester. The invention further relates to an article comprising the composition, particularly a toy block.

21 Claims, No Drawings

COMPOSITION COMPRISING POLYESTER AND POLYOLEFIN

CROSS REFERENCE TO RELATED APPLICATIONS

This application is a National Stage application of PCT/EP2019/062755, filed May 17, 2019, which claims the benefit of European Application No. 18173113.4, filed May 18, 2018, both of which are incorporated by reference in their entirety herein.

The present invention relates to a composition comprising a polyester and a polyolefin. The invention further relates to a process for making such composition and use of such composition for making an article, especially a toy block.

The most common material for articles that—when combined—fit together, for example a toy block such as LEGO® blocks is polycarbonate (PC) or acrylonitrile butadiene styrene (ABS). PC and ABS consist of components such as bisphenol A (BPA), acrylonitrile (AN), styrene (S) and butadiene (BD), for which alternative solutions are sought for environmental reasons and because they are under debate as they are associated with health risks and are therefore especially undesired in children's toys.

Toy blocks made of PC/ABS have a combination of good mechanical properties such as low shrinkage, high impact strength and high tensile modulus. A high glossiness is also an important property for toy blocks.

It is an object of the invention to provide a composition which has a good balance of properties suitable for toy blocks. It is particularly desirable that the composition has modulus and impact properties comparable to PC or ABS.

It is another object of the invention to provide a composition that is suitable for replacing currently used materials in articles that—when combined—interlock.

It is further a challenge to decrease variations in the properties of the compositions made under different processing conditions. It is therefore a further object of the invention to provide a composition having small variations in the properties of the compositions made under different processing conditions. For example, the composition should preferably also have a shrinkage that is comparable to PC or ABS.

For example, when the composition is used as a replacement of polycarbonate or acrylonitile butadiene styrene in a moulding, it is very much desirable that the shrinkage of the composition is similar to that of the PC or ABS, so that the same mould (a specialized and expensive equipment) can be used.

Accordingly, the invention provides a composition comprising A) a polyester, B) a polyolefin and C) a compatibilizer, wherein A) comprises a first polyester derived from an aromatic dicarboxylic acid, an acyclic aliphatic diol and at least one of a cycloaliphatic diol and spiroglycol and optionally a second polyester different from the first polyester.

The invention also provides an article comprising a stud for fitting into a complementary receptacle and/or comprising a receptacle for fitting into a complementary stud, preferably a toy block, comprising a composition comprising A) a polyester, B) a polyolefin and C) a compatibilizer, wherein A) comprises a first polyester derived from an aromatic dicarboxylic acid, an acyclic aliphatic diol and at least one of a cycloaliphatic diol and spiroglycol and a second polyester different from the first polyester.

Preferably, the article comprises at least 95 wt % of the composition, for example at least 96 wt %, for example at least 97 wt %, for example at least 98 wt %, for example at least 99 wt % based on the total weight of the article, for example the article consists of the composition.

It was surprisingly found that the composition according to the invention has a combination of good mechanical properties such as low shrinkage (comparable to PC or ABS), high impact strength and high tensile modulus. The composition according to the invention may further have a good processability and high glossiness.

Further, it was surprisingly found that the use of a polyester derived using the combination of an acyclic aliphatic diol and a cycloaliphatic diol or spiroglycol in the composition according to the invention leads to the reduction in the variation of the various properties, in particular shrinkage, of compositions made under different processing conditions such as the screw design and molding conditions.

This means that the composition of the invention suitably be used in articles that-when combined interlock, as articles of the invention have good mechanical properties, such as high impact strength and high tensile modulus. In addition, the composition of the invention mimics the shrinkage properties of PC and ABS, so that the same hardware, such as dies and moulds can be used for preparing articles from the materials of the invention, as for PC and ABS.

While not wishing to be bound by any theory, the inventors attribute the reason for the low variation to the lowered crystallinity of the polyester caused by the use of the cycloaliphatic diol or spiroglycol.

It is noted that US2006287441 discloses a method for manufacturing a resin composition from a raw material composition containing a polyester resin, a polyolefin resin and a compatibilizer. The process comprises a kneading step for kneading the raw material composition in the presence of moisture.

It is further noted that FR2961213 discloses a composition comprising polyolefin, a polyester and a compatibilizer. The examples relate to compositions wherein the polyolefin is the major component of the composition.

US2007/0004813 A1 discloses in comparative examples 2 and 3 an amorphous polyester comprising 100 mole % terephthalic acid, 10 to 40 mole % 1,4-cyclohexanedimethanol, 35 to 89 mole % ethylene glycol and 1 to 25 mole % diethylene glycol that was combined with linear low density polyethylene (LLDPE) or polypropylene (PP). The compounded products were pelletized, and then combined with the neat copolyester in a 50/50 ratio. The concentrates also contained 1 wt % of ethylene methyl acrylate copolymer (EMAC 2260) as a compatibilizer.

JP H 05 70636 A discloses in inventive example 8 amorphous polyester, cellulose acetate, EMAC 260 and polypropylene (PP).

U.S. Pat. No. 5,281,668 A discloses in example 4, a composition comprising 94 parts by weight of component (B), a copolyester (PET-G) obtained from terephthalic acid and two kidns of diol components (ethylene glycol and 1,4-cyclohexane dimethanol), 5 parts by weight of a saponified ethylene vinylacetate copolymer, 3 parts by weight of a chlorinated polyethylene and 5 parts by weight of a maleic anhydride modified low molecular weight polyethylene oligomer (LMW-PE).

A) POLYESTER

A) may consist of the first polyester, but A) preferably further comprises the second polyester. Preferably, A) consists of the first polyester and the second polyester, Preferably, the amount of the first polyester is 1 to 95 wt % of the total weight of the polyester in the composition according to the invention. More preferably, the amount of the first polyester is 2 to 90 wt %, 5 to 70 wt %, 10 to 50 wt %, 15 to 40 wt % or 20 to 35 wt % of the total weight of the polyester in the composition according to the invention.

Preferably, the amount of the second polyester is 5 to 99 wt % of the total weight of the polyester in the composition according to the invention. More preferably, the amount of the second polyester is 10 to 98 wt %, 30 to 95 wt %, 50 to 90 wt %, 60 to 85 wt % or 65 to 80 wt % of the total weight of the polyester in the composition according to the invention.

Particularly preferably, the amount of the first polyester is 20 to 35 wt % of the total weight of the polyester in the composition according to the invention and the amount of the second polyester is 65 to 80 wt % of the total weight of the polyester in the composition according to the invention.

First Polyester

The first polyester is derived from an aromatic dicarboxylic acid and an acyclic aliphatic diol, and at least one of a cycloaliphatic diol and spiroglycol. Typically, the first polyester is derived from an aromatic dicarboxylic acid, an acyclic aliphatic diol and a cycloaliphatic diol, or from an aromatic dicarboxylic acid, an acyclic aliphatic diol and spiroglycol.

Aromatic Dicarboxylic Acid

Suitable examples of aromatic dicarboxylic acids include acids that contain a single aromatic ring per molecule such as, e.g., isophthalic or terephthalic acid, 1,2-di(p-carboxyphenyl)ethane, 4,4'-dicarboxydiphenyl ether, 4,4'-bisbenzoic acid and mixtures thereof, as well as acids contain fused rings such as, e.g., 1,4— or 1,5-naphthalene dicarboxylic acids. In a preferred embodiment, the aromatic dicarboxylic acid is terephthalic acid or, alternatively, a mixture of terephthalic acid and isophthalic acid.

Acyclic Aliphatic Diol

Preferably, the acyclic aliphatic diol contains 2 to 12 carbon atoms.

Examples of such diols include ethylene glycol; propylene glycol, i.e., 1,2— and 1,3-propylene glycol; 2,2-dimethyl-1,3-propane diol; 2-ethyl, 2-methyl, 1,3-propane diol; 1,4-butanediol; 1,3— and 1,5-pentane diol; dipropylene glycol; 2-methyl-1,5-pentane diol; 1,6-hexane diol; triethylene glycol; 1,10-decane diol.

Cycloaliphatic Diol

When cycloaliphatic diol is used, the molar ratio between the acyclic aliphatic diol and the cycloaliphatic diol may e.g. be 95:5 to 5:95, typically 95:5 to 80:20, for example 95:5 to 50:50 or 50:50 to 80:20.

Preferably, the cycloaliphatic diol contains 2 to 12 carbon atoms.

Examples of such cycloaliphatic diol include dimethanol decalin, dimethanol bicyclo octane; 1,4-cyclohexane dimethanol and particularly its cis- and trans-isomers.

In preferred embodiments, the first polyester is derived from an aromatic dicarboxylic acid, ethylene glycol as the acyclic aliphatic diol and 1,4-cyclohexane dimethanol as the cycloaliphatic diol.

In particularly preferred embodiments, the first polyester is derived from terephthalic acid as the aromatic dicarboxylic acid, ethylene glycol as the acyclic aliphatic diol and 1,4-cyclohexane dimethanol as the cycloaliphatic diol, wherein the molar ratio between ethylene glycol and 1,4-cyclohexane dimethanol is 95:5 to 50:50.

In other particularly preferred embodiments, the first polyester is derived from terephthalic acid as the aromatic dicarboxylic acid, ethylene glycol as the acyclic aliphatic diol and 1,4-cyclohexane dimethanol as the cycloaliphatic diol, wherein the molar ratio between ethylene glycol and 1,4-cyclohexane dimethanol is 50:50 to 80:20.

Spiroglycol When spiroglycol is used, the molar ratio between the acyclic aliphatic diol and the spiroglycol may e.g. be 95:5 to 5:95, 80:20 to 20:80 or 40:60 to 60:40.

Spiroaglycol is represented by the following formula:

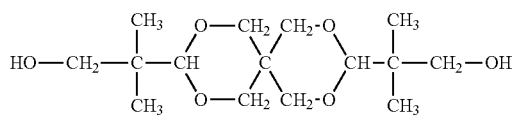

In particularly preferred embodiments, the polyester is derived from an aromatic dicarboxylic acid, ethylene glycol as the acyclic aliphatic diol and spiroglycol.

In some embodiments, the first polyester is a spiroglycol modified poly(ethylene terephthalate) (SPG PET) that is produced by polymerizing a monomer mixture comprising a mixture of spiroglycol, ethylene glycol and terephthalic acid and or an ester thereof (SPG PET) and having a glass transition temperature ($T_g$) of 85 to 130° C.

For example, such polyester is produced by polymerizing a monomer mixture comprising of a mixture of spiroglycol and ethylene glycol in a molar ratio of 45 to 55, and terephthalic acid and/or an ester thereof. Useful SPG PET include those described in U.S. Pat. No. 6,447,859. As provided by U.S. Pat. No. 6,447,859, these SPG PET polyester resins are produced by polymerizing a monomer mixture comprising a glycol component containing 5 to 60 mol percent of a spiroglycol represented by Formula I:

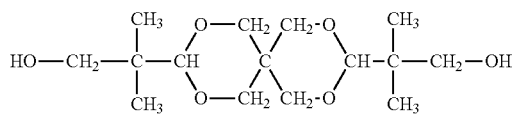

and 30 to 95 mol percent of ethylene glycol, and a dicarboxylic acid component containing 80 to 100 mol percent of terephthalic acid and/or an ester thereof.

The SPG PET may be of a type that is available from Mitsubishi Gas Chemical Company as ALTESTER(R) S2000, ALTESTER(R) S3000, ALTESTER(R) S4500 exhibiting a Tg of 95, 100, and 1 10, respectively. These amorphous high heat copolyesters are distributed by Perstorp as Akestra™ 90, Akestra™ 100, and Akestra™ 110, where 90, 100, and 110 is the Tg of the material. See www.perstorp.com/en/products/plastic materials/heat resistant plastic (last visited Dec. 3, 2015).

Particularly preferred examples of the first polyester include a polyester derived from terephthalic acid as the dicarboxylic acid and ethylene glycol as the acyclic aliphatic diol, and spiroglycol, preferably wherein the molar ratio between ethylene glycol and spiroglycol is 95:5 to 5:95, 80:20 to 20:80 or 40:60 to 60:40.

The second polyester is different from the first polyester and may be of any type. Typically, the second polyester is derived from an aromatic dicarboxylic acid and an acyclic aliphatic diol. Suitable examples of the aromatic dicarboxylic acid for deriving the second polyester include the ones described for the first polyester. Suitable examples of the acyclic aliphatic diol for deriving the second polyester are the ones described for the first polyester. Other examples of the second polyester include polycyclohexylenedimethylene terephthalate.

Particularly preferably, the second polyester is selected from the group consisting of polyethylene terephthalate (PET), polybutylene terephthalate (PBT) and polycyclohexylenedimethylene terephthalate. Preferably, the second polyester is PET.

In particularly preferred embodiments, the first polyester is derived from an aromatic dicarboxylic acid, ethylene glycol as the acyclic aliphatic diol and 1,4-cyclohexane dimethanol as the cycloaliphatic diol, the amount of the first polyester is 1 to 95 wt %, 2 to 90 wt %, 5 to 70 wt %, 10 to 50 wt %, 15 to 40 wt % or 20 to 35 wt % of the total weight of the polyester in the composition according to the invention, the second polyester is PET, and the amount of the second polyester is 2 to 90 wt %, 5 to 70 wt %, 10 to 50 wt %, 15 to 40 wt % or 20 to 35 wt % of the total weight of the polyester in the composition according to the invention.

The polyester may be in the form of unused pellet products or recycled (processed) products in the form of flake, pellet or powder. In particular, the second polyester is preferably a recycled polyester, in particular a recycled PET, for example derived from PET bottles. Preferably the polyester is dried before being mixed with other components of the composition according to the invention.

The polyester may be bio-based, i.e. the polyester may be a polyester produced from materials or products derived from or made using biological raw materials. Such materials are renewable and are typically obtained from or produced by living organisms such as, for example, plants, trees, algae, bacteria, yeast, fungi, protozoa, insects, animals, and the like. Processes for obtaining diacids from such biomaterials are known to those of skill in the art. Biobased or bioderived difunctional acids are preferred because of a lower ecological footprint associated with production and use of such materials.

Preferably, the first polyester has a crystallinity of at most 10% as determined by differential scanning calorimetry using the second cooling curve, wherein the first heating rate is 20° C./min, the first cooling rate is 20° C./min, the second heating rate is 20° C./min, the second cooling rate is 20° C./min and the sample weight is 5 mg, using 140 J/g as the theoretical heat of fusion.

Preferably, the first and/or the second polyester has an intrinsic viscosity (IV) of 0.1 to 1.0 dl/g, for example 0.5 to 0.9 dl/g, as determined by according to ASTM D4603.

Preferably, the first and/or the second polyester has a melt volume index (MVI) of 5 to 100 dg/min, for example 10 to 50 dg/min, according to ISO 1133 (2.16 kg, 280° C.).

Preferably, the first and/or the second polyester has a density of at most 1.35 g/cm$^3$ as determined according to ISO 1183.

Preferably, the amount of the polyester is at least 75 wt %, preferably 75 to 94 wt %, preferably 80 to 94 wt % or 85 to 92 wt % with respect to the total composition.

B) Polyolefin

Examples of the polyolefin include low density polyethylene (LDPE), linear low density polyethylene (LLDPE) and high density polyethylene (HDPE); polypropylene (PP) and an elastomeric copolymer of ethylene and an α-olefin having 4 to 10 carbon atoms.

Preferably, the amount of the polyolefin is 5 to 25 wt %, preferably 5 to 20 wt %, preferably 6 to 18 wt % or 8 to 15 wt % with respect to the total composition.

The polyolefin may have a density of 0.850 to 0.970 g/cm$^3$ determined according to ISO1183.

Preferably the total amount of the polyester and the polyolefin is 90 to 99 wt % with respect to the total composition.

LDPE, LLDPE and HDPE

The production processes of LDPE, LLDPE and HDPE are summarised in Handbook of Polyethylene by Andrew Peacock (2000; Dekker; ISBN 0824795466) at pages 43-66. The catalysts can be divided in three different subclasses including Ziegler Natta catalysts, Phillips catalysts and single site catalysts. The latter class is a family of different classes of compounds, metallocene catalysts being one of them. As elucidated at pages 53-54 of said Handbook a Ziegler-Natta catalysed polymer is obtained via the interaction of an organometallic compound or hydride of a Group 1-III metal with a derivative of a Group IV-VIII transition metal. An example of a (modified) Ziegler-Natta catalyst is a catalyst based on titanium tetra chloride and the organometallic compound triethylaluminium. A difference between metallocene catalysts and Ziegler Natta catalysts is the distribution of active sites. Ziegler Natta catalysts are heterogeneous and have many active sites. Consequently polymers produced with these different catalysts will be different regarding for example the molecular weight distribution and the comonomer distribution.

LDPE

The LDPE may be an ethylene homopolymer or may comprise a comonomer, for example butene or hexene.

Preferably, the LDPE has a density of 0.916 to 0.940 g/cm$^3$, more preferably 0.920 to 0.930 g/cm$^3$, determined according to ISO1183.

Preferably, the LDPE has a Melt flow index of 0.1 to 10.0 g/10 min, more preferably 1.0 to 5.0 g/10 min, determined according to ASTM D1238 (190° C./2.16 kg).

The LDPE may be produced by use of autoclave high pressure technology or by tubular reactor technology.

In some embodiments, the polyolefin in the composition according to the invention is an LDPE having a density of 0.916 to 0.940 g/cm$^3$ determined according to ISO1183 and a Melt flow index of 0.1 to 10.0 g/10 min determined according to ASTM D1238 (190° C./2.16 kg) and the amount of the LDPE in the composition is 5 to 15 wt %.

LLDPE

The LLDPE may be an ethylene homopolymer or may be a polyethylene copolymer comprising ethylene and a C3—C10 alpha-olefin comonomer (ethylene-alpha olefin copolymer). Suitable alpha-olefin co monomers include 1-butene, 1-hexene, 4-methyl pentene and 1-octene. The preferred comonomer is 1-hexene. Preferably, the alpha-olefin co monomer is present in an amount of about 5 to about 20 percent by weight of the ethylene-alpha olefin copolymer, more preferably an amount of from about 7 to about 15 percent by weight of the ethylene-alpha olefin copolymer.

Preferably, the density of the LLDPE may range between 0.915 g/cm$^3$ and 0.940 g/cm$^3$, preferably 0.930 to 0.940 g/cm$^3$, determined according to ISO1183.

Preferably, the melt flow index of the LLDPE ranges from 0.1 to 5.0 g/10 min, for example from 0.5 to 4.0 g/10 min, for example from 1.0 to 3.0 g/10 min, determined according to ASTM D1238 (190° C./2.16 kg).

The technologies suitable for the LLDPE manufacture include but are not limited to gas-phase fluidized-bed polymerization, polymerization in solution, and slurry polymerization.

According to a preferred embodiment of the present invention the LLDPE has been obtained by gas phase polymerization in the presence of a Ziegler-Natta catalyst.

According to another preferred embodiment, the LLDPE may be obtained by gas phase polymerization in the presence of a metallocene catalyst.

In some embodiments, the polyolefin in the composition according to the invention is an LLDPE having a density of 0.915 to 0.940 g/cm$^3$ determined according to ISO1183 and a Melt flow index of 0.1 to 5.0 g/10 min determined according to ASTM D1238 (190° C./2.16 kg) and the amount of the LLDPE in the composition is 5 to 15 wt %.

HDPE

HDPE may be an ethylene homopolymer or may comprise a comonomer, for example butene or hexene.

Preferably, the HDPE has a density of 0.940 to 0.970 g/cm$^3$, more preferably 0.950 to 0.965 g/cm$^3$, determined according to ISO1183.

Preferably, the HDPE has a Melt flow index of 0.1 to 15.0 g/10 min, more preferably 1.0 to 10.0 g/10 min, measured according to ASTM D1238 (190° C./5 kg).

In some embodiments, the polyolefin in the composition according to the invention is an HDPE having a density of 0.940 to 0.970 g/cm$^3$ determined according to ISO1183 and a Melt flow index of 0.1 to 15.0 g/10 min determined according to ASTM D1238 (190° C./2.16 kg) and the amount of the HDPE in the composition is 5 to 15 wt %.

PP

With polypropylene as used herein is meant propylene homopolymer or a copolymer of propylene with an α-olefin, for example an α-olefin chosen from the group of α-olefin having 2 or 4 to 10 C-atoms, for example ethylene, for example wherein the amount of α-olefin is less than 10 wt % based on the total propylene copolymer.

Polypropylene can be made by any known polymerization technique as well as with any known polymerization catalyst system. Regarding the techniques, reference can be given to slurry, solution or gasphase polymerizations; regarding the catalyst system reference can be given to Ziegler-Natta, metallocene or single-site catalyst systems. All are, in themselves, known in the art.

Preferably, the tensile modulus of the PP ranges from 800 to 1800 MPa, determined according to ASTM D790A.

Preferably, the melt flow index of the PP as determined using ASTM D1238 (230° C./2.16 kg) ranges from 0.3 to 50 dg/min.

Elastomeric Copolymer

The polyolefin may be an elastomeric copolymer of ethylene and an α-olefin having 4 to 10 carbon atoms. The α-olefin comonomer in the elastomeric copolymer is preferably an acyclic monoolefin such as 1-butene, 1-pentene, 1-hexene, 1-octene or 4-methylpentene. Most preferably, the elastomeric copolymer is an ethylene-1-octene copolymer.

Preferably, the elastomeric copolymer has a density of 0.850 to 0.910 g/cm$^3$. Preferably, the density of the elastomeric copolymer is 0.865 to 0.910 g/cm$^3$, for example 0.865 to 0.875 g/cm$^3$, according to ASTM D792.

Preferably, the elastomeric copolymer has a melt flow index of 1.0 to 10.0 dg/min, for example 3.0 to 8.0 dg/min, measured in accordance with ASTM D1238 using a 2.16 kg weight and at a temperature of 190° C.

The elastomers may be prepared using methods known in the art, for example by using a single site catalyst, i.e., a catalyst the transition metal components of which is an organometallic compound and at least one ligand of which has a cyclopentadienyl anion structure through which such ligand bondingly coordinates to the transition metal cation. This type of catalyst is also known as "metallocene" catalyst. Metallocene catalysts are for example described in U.S. Pat. Nos. 5,017,714 and 5,324,820. The elastomer s may also be prepared using traditional types of heterogeneous multi-sited Ziegler-Natta catalysts.

Preferably, the amount of ethylene in the elastomer is at least 50 mol %. More preferably, the amount of ethylene in the elastomer is at least 57 mol %, for example at least 60 mol %, at least 65 mol % or at least 70 mol %. Even more preferably, the amount of ethylene in the elastomer is at least 75 mol %. The amount of ethylene in the elastomer may typically be at most 97.5 mol %, for example at most 95 mol % or at most 90 mol %.

In some embodiments, the polyolefin in the composition according to the invention is an elastomeric copolymer of ethylene and an α-olefin having 4 to 10 carbon atoms having a density of 0.850 to 0.910 g/cm$^3$ determined according to ASTM D792 and a Melt flow index of 1.0 to 10.0 g/10 min determined according to ASTM D1238 (190° C./2.16 kg) and the amount of the elastomeric copolymer in the composition is 5 to 15 wt %.

In some embodiments, the polyolefin in the composition according to the invention is an elastomeric copolymer of ethylene and an α-olefin having 4 to 10 carbon atoms having a density of 0.850 to 0.910 g/cm$^3$ determined according to ASTM D792 and a Melt flow index of 1.0 to 10.0 g/10 min determined according to ASTM D1238 (190° C./2.16 kg) and the amount of the elastomeric copolymer in the composition is 15 to 25 wt %.

C) compatibilizer

Preferably, the compatibilizer comprises a copolymer of ethylene and a comonomer selected from the group consisting of an unsaturated carboxylic acid such as acrylic acid, methacrylic acid, maleic acid, fumaric acid and itaconic acid, and its anhydrate; ester of unsaturated carboxylic acid such as methyl acrylate, methyl methacrylate, dimethyl maleate, monomethyl maleate, diethyl fumarate, dimethyl itaconate, diethyl citraconate and dimethyl tetrahydro phthalic acid; glycidylester of unsaturated monocarboxylic acid such as glycidylacrylate, glycidylmethacrylate and glycidyl p-styryl carboxylate; monoglycidylester or polyglycidylester of unsaturated polycarboxylic acid such as maleic acid, itaconic acid, citraconic acid and butenetricarboxylic acid; and unsaturated glycidylether such as allylglycidylether, 2-methylallylglycidylether and glycidylether of o-allylphenol.

Preferably, the weight ratio of the amount of B) with respect to the amount of C) is 2 to 20, 2 to 10 or 3 to 6.

Preferably, the amount of C) in the composition is 0.1 to 15 wt %, for example 0.2 to 12 wt %, 0.3 to 10 wt %, 0.5 to 5 wt %. Most preferably, the amount of C) in the composition is 0.75 to 4 wt %, for example 1 to 3 wt % or 1 to 2 wt %.

Preferably, the total amount of A), B) and C) is at least 95 wt %, at least 98 wt %, at least 99 wt %, at least 99.9 wt % or 100 wt %.

Particularly preferred compatibilizer is a copolymer of ethylene and glycidylmethacrylate, commercially available as Lotader AX8840.

A compatabilizer as defined herein is a component that decreases the interfacial tension between immiscible blends of the polar polyester and the a-polar polyolefin phase. Addition of the compatabilizer improves adhesion between both phases and stabilizes the morphology of the polyester/polyolefin compound against coalescence resulting in improved mechanical properties as compared to the polyester/polyolefin compound without compatabilizer.

D) Additives

The composition according to the invention may further comprise optional components different from the previously mentioned components of the composition, such as additives, wherein the total of the previously mentioned components and the optional components is 100 wt % of the total composition. Accordingly, the invention relates to a composition consisting of the previously mentioned components and the optional components.

The additives may include stabilisers, e.g. heat stabilisers, anti-oxidants, UV stabilizers; colorants, like pigments and dyes; clarifiers; surface tension modifiers; lubricants; flame-retardants; mould-release agents; flow improving agents; plasticizers; anti-static agents; external elastomeric impact modifiers; blowing agents; inorganic fillers such as talc and reinforcing agents; and/or components that enhance interfacial bonding between polymer and filler, such as a maleated polypropylene.

The amount of the additives may e.g. be 0.1 to 5 wt %, for example 0.2 to 1 wt %, based on the total composition.

Properties of Composition

Preferably, the composition according to the invention has melt volume flow rate (MVR) of at least 5 cc/10 min, for example 5 to 20 cc/10 min or 20 to 40 cc/10 min, as determined by ISO1133 (2.16 kg, 265° C., 300 seconds).

Preferably, the composition according to the invention has melt volume flow rate (MVR) of at least 10 cc/10 min, for example 10 to 25 cc/10 min or 25 to 50 cc/10 min, as determined by ISO1133 (2.16 kg, 265° C., 900 seconds).

Preferably, the composition according to the invention has a shrinkage of at most 2%, more preferably at most 1.5%, more preferably at most 1.3%, more preferably at most 1.0%, as determined by ISO 294-4.

Preferably, the composition according to the invention has an Izod notched impact strength of at least 5 kJ/m2, more preferably at least 10 kJ/m2, more preferably at least 20 kJ/m2 or more preferably at least 30 kJ/m2, as determined by ISO180 (23° C.).

Preferably, the composition according to the invention has a Charpy notched impact strength of at least 10 kJ/m2, more preferably at least 15 kJ/m2, more preferably at least 20 kJ/m2 or more preferably at least 30 kJ/m2, as determined by ISO 179-1 (23° C.) Preferably, the composition according to the invention has a tensile modulus of at least 1500 MPa, more preferably at least 1600 MPa, more preferably at least 1800 MPa as determined by ISO527.

Preferably, the composition according to the invention has a gloss of at least 50 gloss units, more preferably at least 75 gloss units, more preferably at least 90 gloss units, as determined by ISO2813 at a measurement angle of 60°.

Preferably, the composition according to the invention has at least one, preferably two, more preferably three, most preferably all, of a shrinkage of at most 2%, more preferably at most 1.5%, more preferably at most 1.3%, more preferably at most 1.0%, as determined by ISO 294-4, a notched impact strength of at least 5 kJ/m2, more preferably at least 10 kJ/m2, more preferably at least 20 kJ/m2 or more preferably at least 30 kJ/m2, as determined by ISO180 (23° C.), a Charpy notched impact strength of at least 10 kJ/m2, more preferably at least 15 kJ/m2, more preferably at least 20 kJ/m2 or more preferably at least 30 kJ/m2, as determined by ISO 179-1 (23° C.) and a tensile modulus of at least 1500 MPa, more preferably at least 1600 MPa, more preferably at least 1800 MPa as determined by ISO527. In addition, the composition preferably has a gloss of at least 50 gloss units, more preferably at least 75 gloss units, more preferably at least 90 gloss units, as determined by ISO2813 at a measurement angle of 600.

Other Aspects

The composition of the invention may be obtained by a process comprising melt-mixing A), B) and C) and optionally the optional components by using any suitable means. Accordingly, the invention further relates to a process for the preparation of the composition according to the invention comprising melt mixing A), B) and C) and optional components. Preferably, the composition of the invention is made in a form that allows easy processing into a shaped article in a subsequent step, like in pellet or granular form. Preferably, the composition of the invention is in pellet or granular form as obtained by mixing all components in an apparatus like an extruder; the advantage being a composition with homogeneous and well-defined concentrations of the additives.

Suitable conditions for melt-mixing, such as temperature, pressure, amount of shear, screw speed and screw design when an extruder is used are known to the skilled person.

The Article

In one embodiment, the article of the invention comprising a stud can suitably be used to interlock with another article of the invention comprising a receptacle for receiving the stud. For example, the stud of one article of the invention may be designed such that it can be removably attached to the protuberance of another article of the invention and/or for example, the stud and the protuberance may be designed for interlocking the articles and/or for example the stud and protuberance may be designed to form fit.

For purpose of the invention with stud is meant a protuberance projecting from a surface or a part.

The article of the invention is for example, a building block, a toy block, a hinge or a gear wheel.

In a special embodiment, the article of the invention comprises a stud for fitting into a complementary receptacle and comprises a receptacle, which is complementary to the stud. Examples of such articles are toy blocks. For example, the stud(s) from the top of one block fit(s) into the receptacle(s) on the bottom of the next block and the stud(s) from the next block fit into the receptacle(s) on the bottom of another block, etc.

The invention therefore also relates to an assembly of at least two articles of the invention, wherein at last one of the at least two articles comprises a stud and another of the at least two articles comprises a receptacle for receiving the stud.

The invention further relates to an article comprising the composition according to the invention. Preferably, the article is an injection molded article.

Preferably, the article is a toy block.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

Experiments

Following materials were used.

PET: copolymer of terephtalic acid, isophtalic acid and diethylene glycol, intrinsic viscosity of 0.800 dl/g as determined by according to ASTM D4603 and MVI of 20 dg/min (2.16 kg, 280° C.) according to ISO 1133 (SABIC® PET BC-112 as commercially available from SABIC)

PCCD: copolymer of cyclohexylenedicarboxylic acid and cyclohexane-1,4-dimethanol PCTG: copolymer of terephtalic acid, diethylene glycol and cyclohexane-1,4-dimethanol (molar ratio between diethylene glycol and cyclohexane-1,4-dimethanol is 20:80)

PETG: copolymer of terephtalic acid, diethylene glycol and cyclohexane-1,4-dimethanol (molar ratio between diethylene glycol and cyclohexane-1,4-dimethanol is 70:30)

SPG: copolymer of terephthalic acid, ethylene glycol and spiroglycol

POE: copolymer of ethylene and 1-octene, MFI of 5 dg/min according to ASTM D1238 (2.16 kg, 190° C.), density of 0.87 g/cm$^3$ according to ASTM D792 Compatibilizer: commercial name LOTADER AX 8840; copolymer of ethylene and glycidylmethacrylate, MFI of 5 dg/min according to ASTM D1238 (2.16 kg, 190° C.), density of 0.964 g/cm$^3$ according to ASTM 1183

Components shown in Table 1 were melt-mixed in a twin-screw extruder. The following properties were measured and summarized in Table 1.

Gloss: ISO 2813 at a measurement angle of 60°
MVR: ISO1133 (2.16 kg and 265° C.), 300 seconds
Notched impact strength: ISO180, 23° C.
Charpy notched impact strength: ISO 179-1, 23° C.
Tensile modulus: ISO527
Shrinkage: ISO 294-4
Heat Deflection Temperature: ISO75
Vicat temperature: ISO306

TABLE 1A

| | | CE1 | CE2 | E3 | E4 | E5 | CE6 |
|---|---|---|---|---|---|---|---|
| PET | wt % | 90.0 | 70.0 | 70.0 | 70.0 | 70.0 | 90.0 |
| PCCD | wt % | | 20 | | | | |
| PCTG | wt % | | | 20 | | | |
| PETG | wt % | | | | 20 | | |
| SPG | wt % | | | | | 20 | |
| POE | wt % | 8.9 | 8.9 | 8.9 | 8.9 | 8.9 | 8.9 |
| compatibilizer | wt % | 1.1 | 1.1 | 1.1 | 1.1 | 1.1 | 1.1 |
| IRGANOX 1010 | wt % | 0.3 | 0.3 | 0.3 | 0.3 | 0.3 | 0.3 |
| IRGAFOS 168 | wt % | 0.25 | 0.25 | 0.25 | 0.25 | 0.25 | 0.25 |
| talc | wt % | | | | | | 0.2 |
| Gloss/60° | | 104 | 100 | 103 | 103 | 102 | 103 |
| MVR 265C/2.16 KG/300 sec | cc/10' | 14.5 | 17.4 | 15.8 | 17.2 | 17.2 | 14.1 |
| Notched Impact Strength 23° C. | kJ/m$^2$ | 9.1 | 11.4 | 36.8 | 13.2 | 7.4 | 9.3 |
| Charpy notched Impact Strength 23° C. | kJ/m$^2$ | 11.3 | 13.3 | 34.4 | 16.8 | 10.4 | 11.8 |
| Tensile Modulus | MPa | 2117 | 1755 | 1807 | 1896 | 2125 | 2227 |
| Shrinkage T-bar | % | 1.2 | 1.2 | 0.9 | 0.8 | 0.8 | 1.2 |
| HDT 1.8 MPa | ° C. | 69 | 66 | 69 | 68 | 71 | 70 |
| VICAT B120 | ° C. | 93 | 85 | 84 | 75 | 91 | 93 |

The amounts of Irganox 1010 and Irgafos 168 and talc are wt part per 100 wt part of the total of polyester, polyolefin and compatibilizer.

Comparing E3-E5 vs CE1 and CE2, it can be understood that the use of the polyester made from two types of diols leads to lower shrinkage. In particular, E4 and E5 have very low shrinkages. E5 has a very favorable combination of various mechanical properties, in particular a very high tensile modulus. In addition, the shrinkage of the compositions of the invention is very similar to the shrinkage of a typical ABS and PC resins. For example, CYCOLAC™ RESIN MG47F, which is ABS that is commercially available from SABIC, has a shrinkage T-bar in the range of 0.5 to 0.8%. For example, polymer LEXAN™ Resins_144R and 104R, which are polycarbonate resins that are commercially available from SABIC have a shrinkage T-bar in the range of 0.5 to 0.7%.

DSC measurements were performed for polyesters shown in Table 2. About 5 mg of granulate sample was weighed and placed in a DSC pan. The lid was crimped on the pan to ensure a closed atmosphere. The sample pan was placed in a DSC cell, and then heated, at a rate of approximately 20° C./min, to a temperature of 280° C. The sample was kept at this temperature for one minute. Then the sample was cooled at a rate of 20° C./min to 20° C., and kept isothermally at that temperature for one minute. The sample was again heated and cool as described before. (second heat and cool curve). The percent crystallinity was calculated by dividing the heat of fusion (Hf), determined from the second heat curve, by a theoretical heat of fusion of 140 J/g for PET, and multiplying this quantity by 100 (% cryst.=(Hf/140 J/g)×100.

TABLE 2

| | Tc 1st cool curve (° C.) | Hf 1st Cool curve (J/g) | Crystallinity 1st Cool curve (%) | Tc 2nd cool curve (° C.) | Hf 2nd Cool curve (J/g) | Crystallinity 2nd Cool curve (%) |
|---|---|---|---|---|---|---|
| PET | 173.6 | 32.2 | 23.0 | 169.2 | 30.2 | 21.6 |
| PET:PCCD = 70:20 (weight) | 160.6 | 27.5 | 19.6 | 155.7 | 25.0 | 17.9 |
| PET:PCTG = 70:20 (weight) | 158.0 | 17.6 | 12.6 | 150.9 | 7.6 | 5.4 |
| PET:PETG = 70:20 (weight) | 148.6 | 7.1 | 5.1 | 144.7 | 3.5 | 2.5 |
| PET:SPG = 70:20 (weight) | 161.9 | 19.8 | 14.1 | 155.9 | 8.6 | 6.1 |

It can be understood that the crystallinity (from second cool curve) is substantially lower when the polyester comprises PCTG, PETG or SPG. In particular, the use of PETG leads to a polyester with an extremely low crystallinity. It is believed that this causes the decrease in the shrinkage of the composition comprising these polyesters, and other beneficial mechanical properties.

The invention claimed is:

1. A composition comprising A) a polyester, B) a polyolefin and C) a compatibilizer, wherein A) comprises a first polyester derived from an aromatic dicarboxylic acid, an acyclic aliphatic diol and at least one of a cycloaliphatic diol and spiroglycol and a second polyester different from the first polyester, wherein B) is an elastomeric copolymer of ethylene and 1-octene and the elastomeric copolymer has a density of 0.85 to 0.91 g/cm$^3$ according to ASTM D792.

2. The composition according to claim 1, wherein the amount of the first polyester is 1 to 95 wt % of the total weight of the polyester in the composition and the amount of the second polyester is 5 to 99 wt % of the total weight of the polyester in the composition.

3. The composition according to claim 1, wherein
the aromatic dicarboxylic acid is selected from isophthalic, terephthalic acid, 1,2-di(p-carboxyphenyl)ethane, 4,4'-dicarboxydiphenyl ether, 4,4'-bisbenzoic acid, 1,4—or 1,5-naphthalene dicarboxylic acids, and mixtures thereof, and/or
the acyclic aliphatic diol is selected from ethylene glycol, propylene glycol, 2,2-dimethyl-1,3-propane diol, 2-ethyl, 2-methyl, 1,3-propane diol, 1,4-butanediol, 1,3—and 1,5-pentane diol, dipropylene glycol, 2-methyl-1,5-pentane diol, 1,6-hexane diol, triethylene glycol, 1,10-decane diol, and mixtures thereof, and/or
the cycloaliphatic diol is selected from the group consisting of dimethanol decalin, dimethanol bicyclo octane, 1,4-cyclohexane dimethanol, and mixtures thereof.

4. The composition according to claim 1, wherein the first polyester is derived from the aromatic dicarboxylic acid, ethylene glycol and 1,4-cyclohexane dimethanol or is derived from the aromatic dicarboxylic acid, ethylene glycol diol and spiroglycol and/or
wherein the first polyester has a crystallinity of at most 10% as determined by differential scanning calorimetry using a second cooling curve, wherein a first heating rate is 20° C./min, a first cooling rate is 20° C./min, a second heating rate is 20° C./min, a second cooling rate is 20° C./min and a sample weight is 5 mg, using 140 J/g as a theoretical heat of fusion.

5. The composition according to claim 1, wherein the second polyester is selected from the group consisting of polyethylene terephthalate (PET), polybutylene terephthalate (PBT) and polycyclohexylenedimethylene terephthalate.

6. The composition according to claim 1, wherein
the amount of A) is at least 75 wt % of the total composition,
the amount of B) is 5 to 22.5 wt % of the total composition and
the weight ratio of the amount of B) with respect to the amount of C) is 2 to 20.

7. The composition according to claim 1, wherein the amount of B) is 8 to 15 wt % with respect to the total composition.

8. The composition according to claim 1, wherein C) comprises a copolymer of ethylene and a comonomer selected from the group consisting of an unsaturated carboxylic acid, an anhydride of an unsaturated carboxylic acid, an ester of unsaturated carboxylic acid, glycidylester of unsaturated monocarboxylic acid, a monoglycidylester or polyglycidylester of unsaturated polycarboxylic acid, and unsaturated glycidylether.

9. The composition according to claim 1, wherein the amount of C) is 0.5 to 5 wt %.

10. The composition according to claim 1, wherein B and C) have a weight ratio of 2 to 10.

11. The composition according to claim 1, wherein the amount of the first polyester is 5 to 70 wt % of the total weight of the polyester in the composition and the amount of the second polyester is 30 to 95 wt % of the total weight of the polyester in the composition.

12. The composition according to claim 1, wherein the amount of the first polyester is 10 to 50 wt % of the total weight of the polyester in the composition and the amount of the second polyester is 50 to 90 wt % of the total weight of the polyester in the composition.

13. The composition according to claim 1, wherein C) comprises a copolymer of ethylene and a comonomer selected from the group consisting of acrylic acid, methacrylic acid, maleic acid, fumaric acid, itaconic acid, an anhydride of acrylic acid, an anhydride of methacrylic acid, an anhydride of maleic acid, an anhydride of fumaric acid, an anhydride of itaconic acid, methyl acrylate, methyl methacrylate, dimethyl maleate, monomethyl maleate, diethyl fumarate, dimethyl itaconate, diethyl citraconate, dimethyl tetrahydro phthalic acid, glycidylacrylate, glycidylmethacrylate and glycidyl p-styryl carboxylate, a monoglycidylester or polyglycidylester of maleic acid; itaconic acid; citraconic acid; or butenetricarboxylic acid, allylglycidylether, 2-methylallylglycidylether and glycidylether of o-allylphenol.

14. The composition according to claim 1, wherein (C) comprises a copolymer of ethylene and glycidylmethacrylate.

15. The composition of claim 1, wherein the first polyester is derived from the aromatic dicarboxylic acid, ethylene glycol and 1,4-cyclohexane dimethanol.

16. A composition comprising:
A) a polyester comprising
a first polyester derived from an aromatic dicarboxylic acid, ethylene glycol and 1,4-cyclohexane dimethanol or is derived from the aromatic dicarboxylic acid, ethylene glycol diol and spiroglycol, and
a second polyester different from the first polyester, the second polyester comprising polyethylene terephthalate;
wherein the amount of the first polyester is 10 to 50 wt % of the total weight of the polyester in the composition and the amount of the second polyester is 50 to 90 wt % of the total weight of the polyester in the composition,
B) an elastomeric copolymer of ethylene and 1-octene and the elastomeric copolymer having a density of 0.85 to 0.91 g/cm$^3$ according to ASTM D792, and
C) a compatibilizer comprising a copolymer of ethylene and glycidylmethacrylate,
wherein the amount of A) is at least 75 wt % of the total composition,
the amount of B) is 8 to 15 wt % of the total composition and
the weight ratio of the amount of B) with respect to the amount of C) is 2 to 20.

17. The composition of claim 16,
wherein the first polyester is derived from terephthalic acid as the dicarboxylic acid, ethylene glycol, and spiroglycol, and
wherein a molar ratio between ethylene glycol and spiroglycol is 40:60 to 60:40.

18. An article comprising a stud for fitting into a complementary receptacle and/or comprising a receptacle for fitting into a complementary stud, the article comprising the composition of claim 1.

19. The article according to claim 18, wherein the article is an injection molded article or wherein the article is a building block, a toy block, a hinge or a gear wheel.

20. The article according to claim 18, wherein the article comprises a stud for fitting into a complementary receptacle and the article comprises a receptacle which is complementary to the stud.

21. A process for the preparation of the composition according to claim 1 comprising melt mixing A), B) and C) and optional components.

\* \* \* \* \*